United States Patent
Schubert et al.

(10) Patent No.: US 11,345,313 B2
(45) Date of Patent: May 31, 2022

(54) SYSTEM FOR CONTROLLING OPERATIONS OF A VEHICLE USING MOBILE DEVICES AND RELATED METHODS THEREOF

(71) Applicant: Ford Global Technologies, LLC, Dearborn, MI (US)

(72) Inventors: Jochen Schubert, Royal Oak, MI (US); Tom Nelson, Plymouth, MI (US); Michael Andrew Simons, Redford, MI (US); Ali Hassani, Ann Arbor, MI (US); Hamid Golgiri, Livonia, MI (US); John Robert Van Wiemeersch, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/856,509

(22) Filed: Apr. 23, 2020

(65) Prior Publication Data
US 2021/0331646 A1    Oct. 28, 2021

(51) Int. Cl.
*B60R 25/24* (2013.01)
*G07C 9/29* (2020.01)
*B60R 25/20* (2013.01)

(52) U.S. Cl.
CPC ........ *B60R 25/241* (2013.01); *B60R 25/2018* (2013.01); *B60R 25/246* (2013.01); *G07C 9/29* (2020.01)

(58) Field of Classification Search
None
See application file for complete search history.

(56) References Cited

U.S. PATENT DOCUMENTS

| | | | |
|---|---|---|---|
| 7,146,129 B2* | 12/2006 | Bostrom | H04W 4/14 455/3.03 |
| 7,821,383 B2* | 10/2010 | Sultan | G07C 9/00309 340/426.13 |
| 7,928,829 B2* | 4/2011 | Hermann | B60R 25/24 340/5.72 |

(Continued)

FOREIGN PATENT DOCUMENTS

CN    106301781 A  *  1/2017
CN    106301781 A     1/2017

(Continued)

OTHER PUBLICATIONS

"CycurACCESS. Vehicle access and key sharing solution," ESCRYPT Product Flyer, 2019, 8 pages.

*Primary Examiner* — Fekadeselassie Girma
(74) *Attorney, Agent, or Firm* — Frank Lollo; Brooks Kushman P.C.

(57) ABSTRACT

The present disclosure relates to aspects of authenticating a mobile device and providing a vehicle access key thereto when a previously registered mobile device is not accessible. In one aspect of the present disclosure, a method includes requesting at a first mobile device, access to a profile associated with controlling operations of a vehicle, the profile having stored thereon an access key for operating the vehicle, the access key having been previously installed on a second mobile device. The method further includes upon successful authorization, receiving the access key at the first device and operating the vehicle using the access key on the first mobile device.

14 Claims, 9 Drawing Sheets

(56) References Cited

U.S. PATENT DOCUMENTS

| | | | | |
|---|---|---|---|---|
| 8,947,202 B2* | 2/2015 | Tucker | ................ | H04W 12/04 |
| | | | | 340/5.61 |
| 9,276,736 B2* | 3/2016 | Peirce | ................ | H04L 9/0819 |
| 9,373,208 B2* | 6/2016 | Candelore | ......... | G07C 9/00182 |
| 9,499,125 B2* | 11/2016 | Akay | ................ | B60R 25/24 |
| 9,607,256 B2* | 3/2017 | Hill | ................ | G06K 19/06028 |
| 9,744,852 B2* | 8/2017 | Buttolo | ................ | G06F 7/00 |
| 9,747,740 B2* | 8/2017 | Buttolo | ................ | G07C 9/33 |
| 9,860,710 B2* | 1/2018 | Buttolo | ................ | H04W 4/021 |
| 9,914,415 B2* | 3/2018 | Buttolo | ................ | H04W 4/80 |
| 9,914,418 B2* | 3/2018 | Buttolo | ................ | B60R 16/037 |
| 9,947,153 B2* | 4/2018 | Bergerhoff | ......... | G07C 9/00571 |
| 9,967,717 B2* | 5/2018 | Buttolo | ................ | B60R 16/037 |
| 10,046,637 B2* | 8/2018 | Buttolo | ................ | G06F 3/04845 |
| 10,060,827 B2* | 8/2018 | Schnell | ................ | G07C 5/008 |
| 10,147,250 B2* | 12/2018 | Kimura | ................ | G06F 21/35 |
| 10,200,371 B2* | 2/2019 | Darnell | ................ | G06Q 10/02 |
| 10,217,304 B2* | 2/2019 | Chen | ................ | G01S 5/0018 |
| 10,249,123 B2* | 4/2019 | Hatton | ................ | G07C 9/00857 |
| 10,299,129 B2* | 5/2019 | Dieckmann | ......... | H04L 63/107 |
| 10,384,644 B2* | 8/2019 | Pudar | ................ | G07C 9/00571 |
| 10,433,133 B2* | 10/2019 | Tschache | ................ | H04W 12/08 |
| 10,501,053 B2* | 12/2019 | Tokunaga | ................ | H04L 63/108 |
| 10,676,066 B2* | 6/2020 | Liu | ................ | B60R 25/20 |
| 10,730,481 B2* | 8/2020 | Burgkhardt | ......... | B60R 25/241 |
| 10,800,379 B2* | 10/2020 | Chin | ................ | H04W 12/069 |
| 10,853,629 B2* | 12/2020 | Blanc-Paques | ........ | G06Q 50/30 |
| 10,882,493 B2* | 1/2021 | Foster | ................ | G06Q 20/3224 |
| 2011/0119734 A1* | 5/2011 | Crawford | ................ | G05B 9/02 |
| | | | | 726/3 |
| 2013/0179005 A1* | 7/2013 | Nishimoto | ............. | B60R 25/24 |
| | | | | 701/2 |
| 2014/0277837 A1* | 9/2014 | Hatton | ............. | G07C 9/00309 |
| | | | | 701/2 |
| 2016/0300417 A1* | 10/2016 | Hatton | ............. | G07C 9/00857 |

FOREIGN PATENT DOCUMENTS

| | | | |
|---|---|---|---|
| CN | 106408701 A | * | 2/2017 |
| CN | 108248548 A | | 7/2018 |
| WO | 2017-108818 A1 | | 6/2017 |

\* cited by examiner

SYSTEM FOR CONTROLLING OPERATIONS OF A VEHICLE USING MOBILE DEVICES AND RELATED METHODS THEREOF

TECHNICAL FIELD

The present disclosure relates to controlling vehicle operations using a mobile device.

BACKGROUND

Vehicles can be equipped with a technology known as phone-as-a-key (PaaK) that enables a user to gain access to the vehicle using a registered mobile device. PaaK, when installed in vehicles, allows the user to control various vehicle functions using the registered mobile device, thereby eliminating the need of a conventional key fob. The PaaK system interacts with the registered mobile device over a short-range network, such as Bluetooth®, Ultra-Wideband, (UWB) or Wi-Fi. Although, the PaaK system allows access to the vehicle without the use of the conventional key fob, there are certain limitations associated with the available PaaK systems. For instance, the user may not be able to access the vehicle in case he/she is not in the possession of the registered mobile device (e.g., the registered mobile device has been replaced) or the registered mobile device is not accessible.

Accordingly, there is a need to address vehicle accessibility when the "master" mobile device is inaccessible.

SUMMARY

The present disclosure relates to aspects of operating a vehicle by authenticating a new mobile device (hereinafter referred as a first mobile device) when a registered mobile device (hereinafter referred as a second mobile device) is not accessible, thereby eliminating a need to access the registered mobile device to transfer the vehicle's digital access key to the new mobile device for operating the vehicle.

According to one aspect of the present disclosure, a request is made by the first mobile device to obtain access to or a copy of a transferable access key stored on a second mobile device that provides access to control various operations of a vehicle. The access key is transferred to the first mobile device only upon successful authorization of the first mobile device. Subsequently, the first mobile device may operate the vehicle using the transferred access key, where some of the operations that may be performed include, but are not limited to, turning on the vehicle, turning off the vehicle, parking the vehicle, adjusting cabin parameters of the vehicle and controlling movement and speed of the vehicle.

In one aspect, a method includes requesting at a first mobile device, access to a profile associated with controlling operations of a vehicle, the profile having stored thereon an access key for operating the vehicle, the access key having been previously installed on a second mobile device; upon successful authorization, receiving the access key at the first device; and operating the vehicle using the access key on the first mobile device.

In one aspect, a mobile device includes a memory with computer-readable instructions corresponding to an application for vehicle access stored therein and one or more processors. The one or more processors are configured to execute the computer-readable instructions to request access to a profile associated with controlling operations of a vehicle, the profile having an access key for operating the vehicle, the access key being currently active on a different mobile device. Upon successful authorization, the one or more processors receive the access key via the application; and operate the vehicle using the access key on the mobile device.

In one aspect, one or more non-transitory computer-readable media include computer-readable instructions for an application for vehicle control, which when executed by one or more processors of a first mobile device, cause the mobile device to request access to a profile associated with controlling operations of a vehicle. The profile includes a transferrable access key that is currently available on a second mobile device for operating the vehicle. Upon successful authorization, the mobile device receives the access key via the application and operates the vehicle using the access key on the mobile device.

BRIEF DESCRIPTION OF THE DRAWINGS

The above-mentioned aspects are further described herein with reference to the accompanying figures. It should be noted that the description and figures relate to exemplary aspects and should not be construed as a limitation to the present disclosure. It is also to be understood that various arrangements may be devised that, although not explicitly described or shown herein, embody the principles of the present disclosure. Moreover, all statements herein reciting principles, aspects, and examples of the present disclosure, as well as specific examples, are intended to encompass equivalents thereof.

DETAILED DESCRIPTION

The present disclosure provides examples directed to aspects of operating a vehicle by authenticating the use of a new mobile device as a vehicle entry key (PaaK) when a previously registered mobile device is not accessible, thereby eliminating a need to access the registered mobile device to transfer the vehicle's digital access key to the new mobile device (provide the vehicle's digital access key to the new mobile device) for operating the vehicle.

For example, a request is made by the first mobile device to obtain access to or a copy of a transferable access key stored on a second mobile device that provides access to control various operations of a vehicle. The access key is transferred to the first mobile device only upon successful authorization of the first mobile device. Subsequently, the first mobile device may operate the vehicle using the transferred access key. Some of the operations that may be performed include, but are not limited to, turning on the vehicle, turning off the vehicle, parking the vehicle, locking the vehicle, unlocking the vehicle, adjusting cabin parameters of the vehicle and controlling movement and speed of the vehicle.

In the following description, certain specific details are set forth in order to provide a thorough understanding of various disclosed examples. However, one skilled in the relevant art will recognize that examples may be practiced without one or more of these specific details, or with other methods, components, materials, etc.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one example" or "an example" means that a particular feature, structure or characteristic described in connection with the example is included in at least one example. Thus, the appearances of the phrases "in one example" or "in an example" in various places throughout this specification are not necessarily all referring to the same example. Furthermore, the particular features, structures, or characteristics may be combined in any suitable manner in one or more examples.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Figure 1:
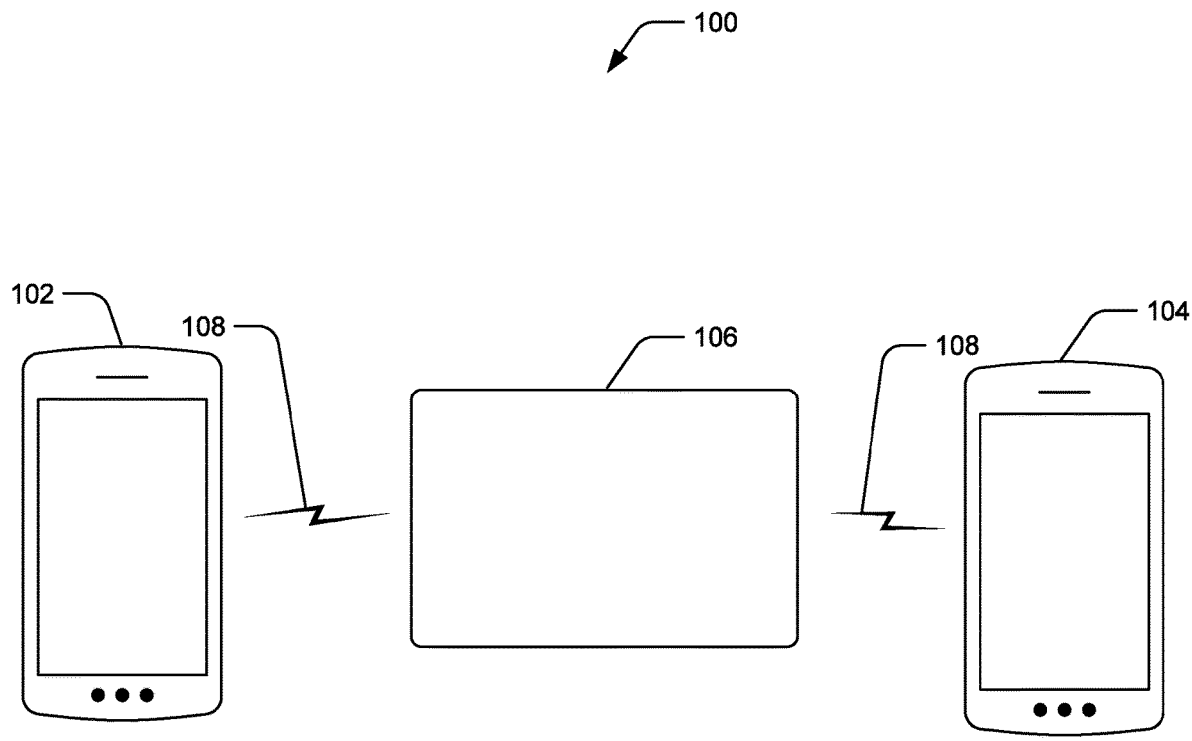
FIG. 1 illustrates a network environment for authenticating a first mobile device and a second mobile device, in accordance with one aspect of the present disclosure.

FIG. 1 illustrates a network environment 100 for authenticating one or more mobile devices, such as a first mobile device 102 and a second mobile device 104, to provide access for controlling operations of a vehicle (not shown), in accordance with one aspect of the present disclosure. The first and second mobile devices 102 and 104 may be phones, smartphones, or any other portable computing device capable of establishing wireless communication sessions using any known or to be developed wireless communication scheme such as, but not limited to, short-range wireless communication session (e.g., a Bluetooth® connection, UWB, a Wi-Fi connection, etc.) Further, the vehicle may be any automobile such as a car, a van, or a bus (including an autonomous or semi-autonomous vehicle), using all known methods of powertrain and propulsion systems (i.e., combustion engine, battery electric, hybrid, etc.).

The network environment 100 includes an authentication system 106 configured to authenticate the first mobile device 102 and the second mobile device 104, thereby allowing a user of the first and second mobile devices 102 and 104 to control various operations of the vehicle by using an access key (a digital access key). The access key is associated with a profile of the user. The profile is used by the authentication system 106 to authenticate the first and second mobile devices 102 and 104 and to activate the access key on the first mobile device 102 and/or the second mobile device 104. The profile includes information pertaining to the vehicle, the user, and/or the first and second mobile devices 102 and 104, the access key and authorization information. The access key may include, but is not limited to, an encrypted passcode, or the like and can be activated on multiple mobile devices, allowing the user to control the operations of the vehicle using multiple mobile devices similar to the mobile devices 102 and 104. The authorization information may include, but is not limited to, login credentials of the user. In one example, the operations of the vehicle can include, but is not limited to, turning on the vehicle, turning off the vehicle, parking the vehicle, locking the vehicle, unlocking the vehicle, adjusting cabin parameters of the vehicle, and controlling movement and speed of the vehicle.

In one example, the access key may be active on the second mobile device 104, while the user may request access to the digital access key to control the vehicle operations using the first mobile device 102. This can be due to a number of reasons such as the second mobile device 104 being no longer accessible (due to a number of reasons such as theft, loss, damage, etc.) or being exchanged with the first mobile device 102, etc. In such a scenario, the authentication system 106 authenticates the first mobile device 102 and transfers the access key to the first mobile 102 for controlling the vehicle operations, as will be described below. In one example, the authentication system 106 authenticates the first mobile device 102 using an account login by validating login credentials input by the user of the first mobile device 102. In another example, the authentication system 106 processes answers provided by the user of the first mobile device 102 corresponding to a predefined one or more security questions to validate the first mobile device 102. The authentication system 106 may also validate the first mobile device 102 using multi-factor authentication, two-step authentication, a text message to the first mobile device 102, a telephone call to the first mobile device 102 or the like.

The authentication system 106 can communicate with the first mobile device 102 and the second mobile device 104 over a network 108. The network 108 may be a wired network, a wireless network, such as a cellular network or any known or to be developed short-range wireless communication network, or a combination thereof. The network 108 may also be an individual network or a collection of many such individual networks, interconnected with each other and functioning as a single large network, e.g., the Internet or an Intranet. The network 108 may be one of the different types of networks, such as an intranet, local area network (LAN), wide area network (WAN), and the internet. The network 108 may either be a dedicated network, a virtual network, or a shared network, which represents an association of the different types of networks that use a variety of protocols, for example, Hypertext Transfer Protocol (HTTP), and Transmission Control Protocol/Internet Protocol (TCP/IP), to communicate with each other.

Advantages of the techniques of the present disclosure are manyfold. First, the technique of the present disclosure eliminates a need of an already registered mobile device to gain access to the vehicle. Second, since the authorization information is not restricted to the registered mobile device, the entire process becomes more dynamic and user-friendly.

More details pertaining to the authentication system 106, the mobile devices 102 and 104, and authentication methods are provided with reference to subsequent Figures.

Figure 2:
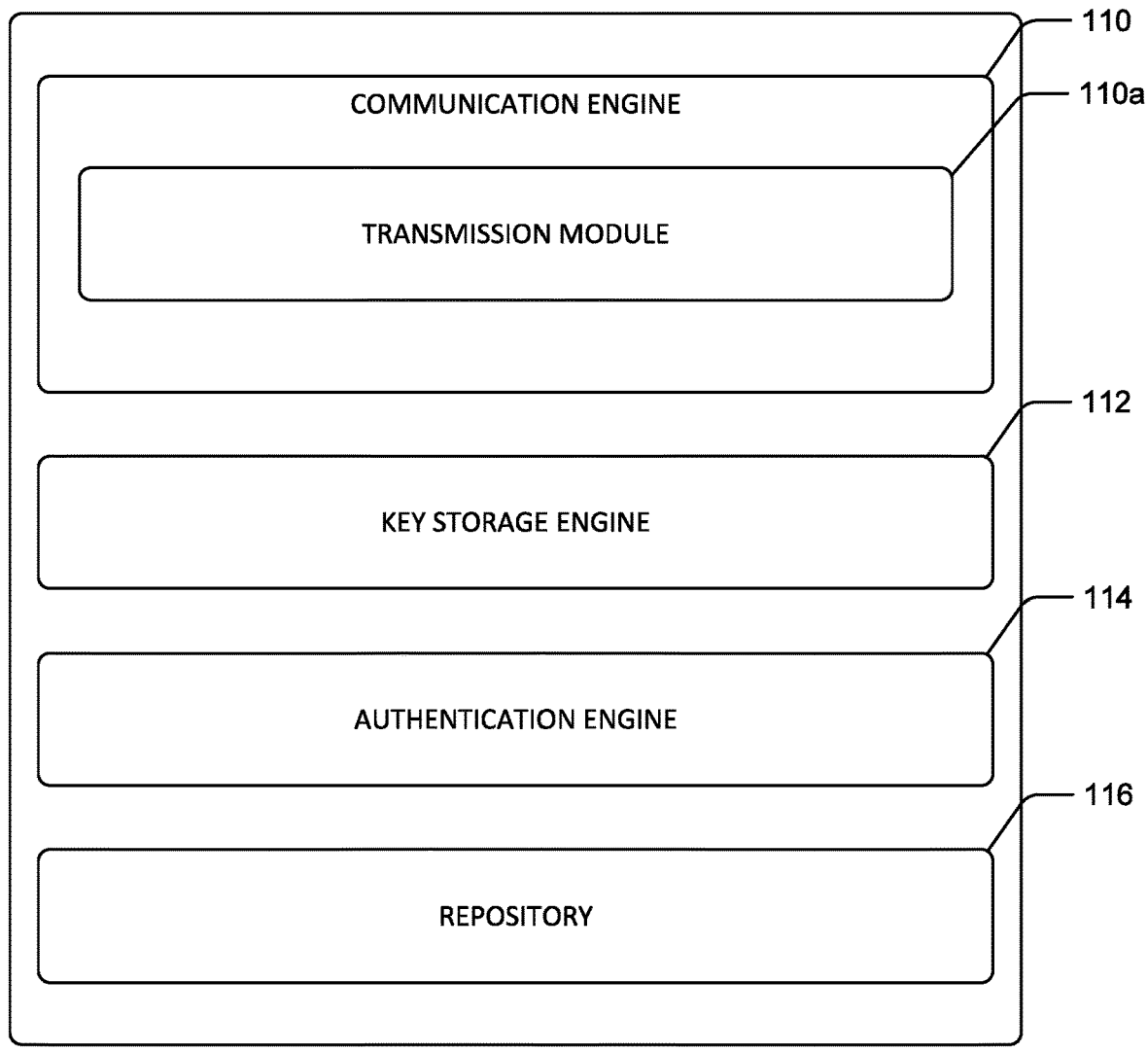
FIG. 2 illustrates a schematic of an authentication system, in accordance with one aspect of the present disclosure.

FIG. 2 illustrates a schematic of an authentication system (such as the authentication system 106, as shown in FIG. 1) that is suitable to implement the present disclosure. The authentication system 106 includes a communication module (service) 110, a key storage module (service) 112, and an authentication module (service) 114. The modules 110, 112 and 114 may be implemented as one or more microprocessors, microcomputers, microcontrollers, digital signal processors, central processing units, state machines, logic circuitries, and/or any devices that manipulate signals, based on operational instructions. Further, the authentication system 106 includes a repository 116 configured to store the profile of the user, including the access key and the authorization information. In one example, the access key may be stored separate from the profile in the key storage module 112, which communicates with the repository 116 when authenticating the first and second mobile devices 102 and 104. It should be noted that the key storage module 112 and/or the repository 116 may store the access key for more than one vehicle.

The communication module 110 includes a transmission module 110a configured to communicate with the first mobile device 102, the second mobile device 104, and the vehicle (not shown) over the network 108. In one example, the transmission module 110a is a transceiver unit that can receive a request for authentication from the first mobile device 102 and/or the second mobile device 104 and the access key from the repository 116 or the key storage module 112. In addition, the transmission module 110a may transfer the access key to the first and/or second mobile device 102, 104 upon successful authentication thereof by the authentication module 114.

In the illustrated example, the authentication module 114 is configured to authenticate the first mobile device 102 such that access to the access key is provided on the first mobile device 102 when the second mobile device 104, already having an active access key, is not accessible. Specifically, the authentication module 114 receives a request from the first mobile device 102 to obtain the access key. Upon receiving the request, the authentication module 114 verifies the first mobile device 102 using the profile and the authorization information and transfers the access key to the first mobile device 102 for controlling the vehicle operations. In one example, the authentication system 106 authenticates the first mobile device 102 using an account login by validating login credentials input by the first mobile device 102. In another example, the authentication system 106 processes answers with information provided by the user of the first mobile device 102 corresponding to a predefined one or more security questions to validate the first mobile device 102. The authentication system 106 may also validate the first mobile device 102 using multi-factor authentication, two-step authentication, a text message to the first mobile device 102, a telephone call to the first mobile device 102 or the like. To transfer the access key, the authentication module 114 may instruct the key storage module 112 or the repository 116 to provide the access key to the first mobile device 102 through the communication module 110. In one example, the verification of the first mobile device 102 refers to verifying that the first mobile device 102 belongs to the user of the vehicle associated with the registered profile and authorization information in repository 116. In case the verification fails, the authentication module 114 rejects the request of the first mobile device 102 to gain access to the access key. A manner by which the authentication module 114 authenticates the first mobile device 102 and the second mobile device 104 is explained in greater detail with reference to FIGS. 4 and 8.

In one example, in addition to storing the information related to the first and second mobile devices 102 and 104 and the user profile, the repository 116 may also hold information related to the date and time when the access key was transferred to different mobile devices, such as the first and second mobile devices 102 and 104. Such information on access date and time may be used to track the number of different mobile devices to which the access key may be provided. In one scenario, the authentication module 114 of the authentication system 106 may fetch the information on the number of different mobile devices to which the access key is provided and may restrict providing the access key to any additional mobile devices if a maximum number of different mobile devices on which the access key can be installed, is reached. In another example, when such maximum number of different devices (which may be a configurable parameter determined based on experiments and/or empirical studies) is reached, the authentication module 114 may revoke the access key on one of the different devices on which the access key is currently active and provide a copy of the access key on a new requesting mobile device.

Also, providing the access key to the first or second mobile devices 102, 104 may be restricted in cases where the user enters incorrect user/authorization information for more than a maximum number of allowed attempts (which may be a configurable parameter determined based on experiments and/or empirical studies). Such restriction reduces the probability of occurrence of vehicle theft by either blocking the user for a predetermined duration or by other suitable means known in the art. In another scenario, the authentication module 106 may also restrict the number of times the access key is transferred to each of the different mobile devices.

Further, the present disclosure allows manifestation of the authentication system 106 in various ways. For instance, in one example, the authentication system 106 authenticates the first mobile device 102 using a cloud-based authentication system. In another example, the authentication system 106 may be local and installed in the vehicle. In yet another example, the authentication system 106 is also local and stored on a mobile device, such as the second mobile device 104, which already has the active access key. Details related to each of these examples will be provided below with reference to FIGS. 4, 5, and 6 respectively.

Figure 3:
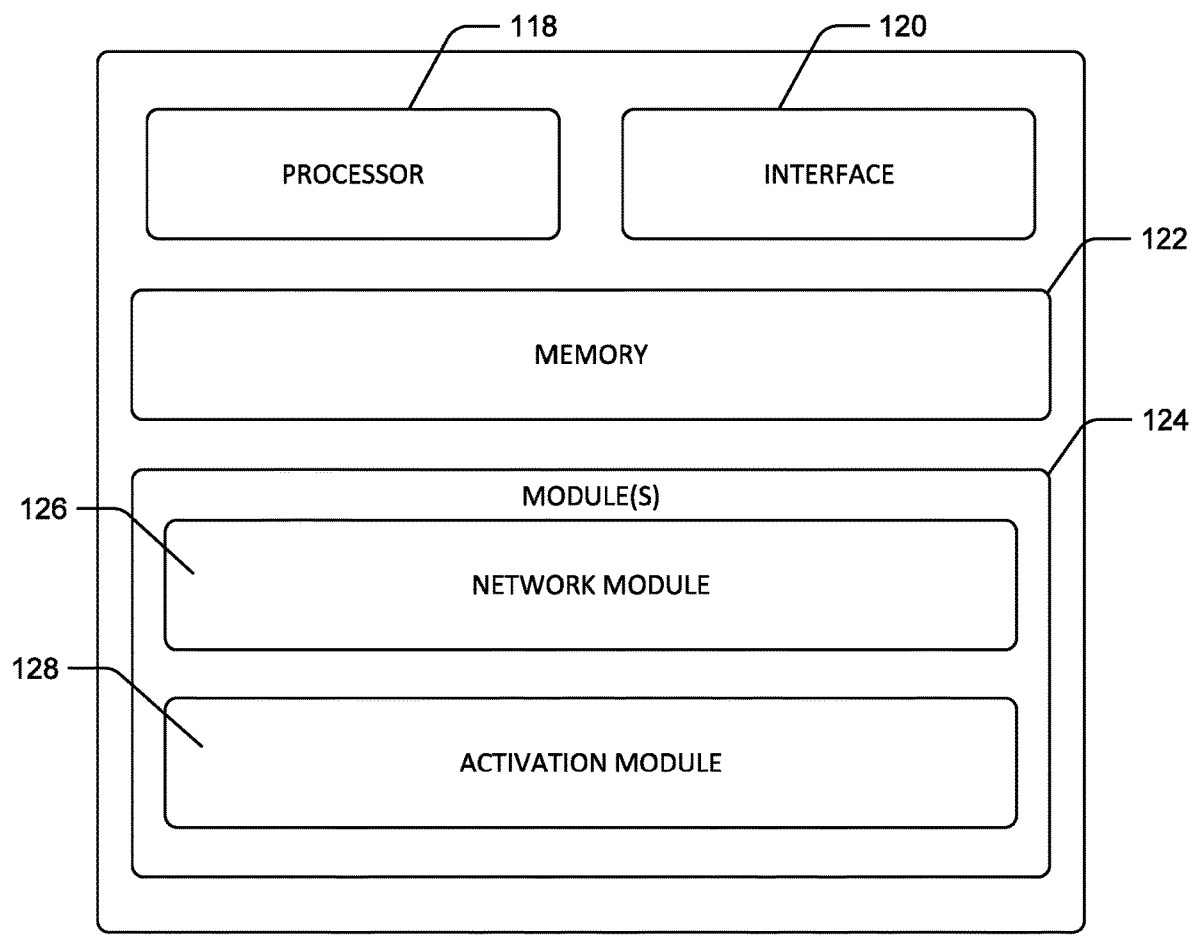
FIG. 3 illustrates a mobile device configured to receive an access key used to operate a vehicle, in accordance with one aspect of the present disclosure.

FIG. 3 illustrates a mobile device, such as the first mobile device 102 or the second mobile device 104, configured to receive the access key to perform various operations of the vehicle. The mobile device may include a processor 118, an interface 120, and a memory 122. The processor 118, amongst other capabilities, is configured to fetch and execute computer-readable instructions stored in the memory 122. Those skilled in the art would appreciate that the processor 118 may be implemented as one or more microprocessors, microcomputers, microcontrollers, digital signal processors, central processing units, state machines, logic circuitries, and/or any devices that manipulate signals based on operational instructions. The functions of various elements shown in the illustrated figure, including any functional steps labelled as "processor", may be provided using dedicated hardware as well as hardware capable of executing software in association with the appropriate software.

Further, the memory 122 may be coupled to the processor 118 and may, among other capabilities, provide data and instructions for generating different requests. The memory 122 may include any computer-readable medium known in the art including, but not limited to, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 122 may hold one or more computer-readable instructions for an application that may allow the mobile device, such as the first mobile device 102 or the second mobile device 104, to communicate with the authentication system 106. Further, the processor 118 may execute the computer-readable instructions to run the application on the mobile device.

The application may be installed on the mobile device such that the user may interact with the application through the interface 120, such as a graphical user interface (GUI). The interface 120 also allows the mobile device to interact with the processor 118 and other such entities of the mobile device using suitable hardware interfaces. Further, the application may interact with one or more module(s) 124 of the mobile device, such as a network module 126 and an activation module 128.

The one or more module(s) 124 may perform different functions including, but not limited to, receiving the access key from the authentication system 106, activating or deactivating the usage of the access key, establishing a connection with the vehicle to control various operations of the vehicle. Specifically, the application allows the user to create the profile on the authentication system 106, including information pertaining to the user, the vehicle, along with the transferable access key and the authorization information. In one example, the application may interact with the network module 126 to allow the creation of the profile. It should be noted that a single profile may be linked to two or more vehicles. To complete the process of profile creation, the application requires the user to input the authorization information corresponding to the user profile, which would thereafter be used for authentication and transferring the access key stored in the authentication system 106.

Further, the application allows the user to select the implementation of the authentication system 106 and mode of obtaining the access key. For instance, the application may implement the authentication system 106 over the cloud. In one aspect, the cloud-based authentication may be set as a default mode. In another instance, the application may implement the authentication system 106 on the vehicle or on another mobile device, especially when the default mode is not available.

More details pertaining to the interaction between the mobile devices, such as the first mobile device 102 or the second mobile device 104, and the authentication system 106 are explained with reference to FIGS. 4-6. In addition, these Figures explain examples of various modes that may be employed to obtain the access key.

Figure 4:
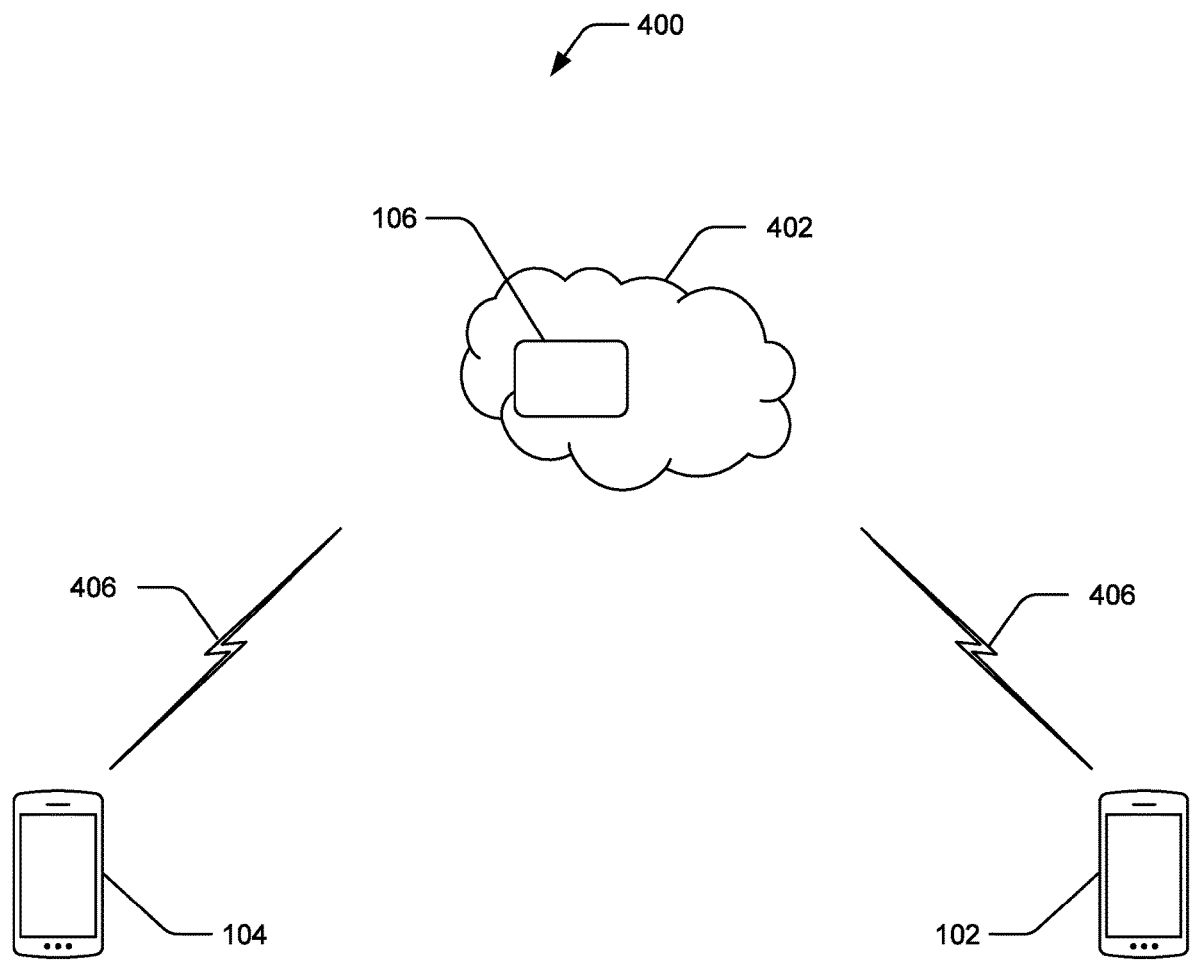
FIG. 4 illustrates another network environment where authentication of a first mobile device and a second mobile device is performed over a cloud accessible system, in accordance with one aspect of the present disclosure.

FIG. 4 illustrates a network environment 400 where authentication of the first mobile device 102 and the second mobile device 104 is performed over a cloud accessible system 402. The cloud accessible system 402 is configured to communicate with the first mobile device 102 and the second mobile device 104 over an over-the-air connection 406, which may be any known or to be developed wireless and/or wired communication scheme. In one example, the over-the-air connection 406 may be established using an application running on the first and second mobile devices 102 and 104.

The cloud accessible system 402 includes the authentication system 106 that is configured to authenticate the first mobile device 102 and the second mobile device 104 and provide access to a vehicle access key to the first mobile device 102 and/or the second mobile device 104. As explained in the previous examples, the authentication system 106 stores the profile of the user, including the corresponding transferable access key and the authorization information. The authentication system 106 of the cloud accessible system 402 transfers the access key to the first and the second mobile devices 102 and 104, upon authentication using the authorization information, such as login credentials.

In addition, the cloud accessible system 402 may include details regarding the number of mobile devices that can obtain the access key. Such details may be required by the cloud accessible system 402 to limit the number of different mobile devices on which the access key may be activated/installed, as described above. For instance, the cloud accessible system 402 may deactivate the access key on a mobile device, in case the number of permissible active copies of the access key exceeds a predetermined threshold (where such threshold may be the same as the number of different mobile devices on which the access key may be activated, as described above). Such a provision is advantageous in case any of the mobile devices having the active access key is no longer with the user, in scenarios such as loss, theft, and replacement.

In operation, the authentication system 106 of the cloud accessible system 402, when triggered by the second mobile device 104, establishes a connection with the second mobile device 104 using the over-the-air connection 406 to allow the user to create the profile, having the transferrable access key and the authorization information, with the authentication system 106.

In scenarios when the second mobile device 104 is not accessible, the authentication system 106 transfers the access key to the first mobile device 102 upon receiving a request from the first mobile device 102 to obtain the access key for controlling the vehicle operations. The access key is transferred only when the authentication system 106 authenticates the first mobile device 102, using the authorization information associated with the profile of the user. Specifically, the authentication system 106 matches the authorization information received from the first mobile device 102 with the authorization information stored thereon. In case the received authorization information does not match the stored authorization information, the request to transfer the access key is declined and the over-the-air connection 406 is terminated.

On the other hand, in case the received authorization information matches with the stored authorization information, the authentication system 106 transfers the access key to the first mobile device 102 through the over-the-air connection 406 to control the various operations of the vehicle. Additionally, the authentication system 106 may also update the profile with the information of the first mobile device 102. The information of the second mobile device 104 may or may not be retained in the profile based on the input from the user. In one scenario, the authentication system 106 may fetch the information on the frequency of transferring the access key and may restrict the transferring once a maximum number of allowed mobile devices that can obtain the access key is reached or in other words a maximum number of allowed copies of the access key is reached. In case the maximum number is not reached, the authentication system 106 transfers the access key to the first mobile device 102 to control the various operations of the vehicle. On the other hand, in case the maximum number is reached, the authentication system 106 sends an instruction to another mobile device having the active access key, such as the second mobile device 104, to deactivate or disable the access key. Once disabled on the second mobile device 104, the access key is transferred to the first mobile device 102.

Figure 5:
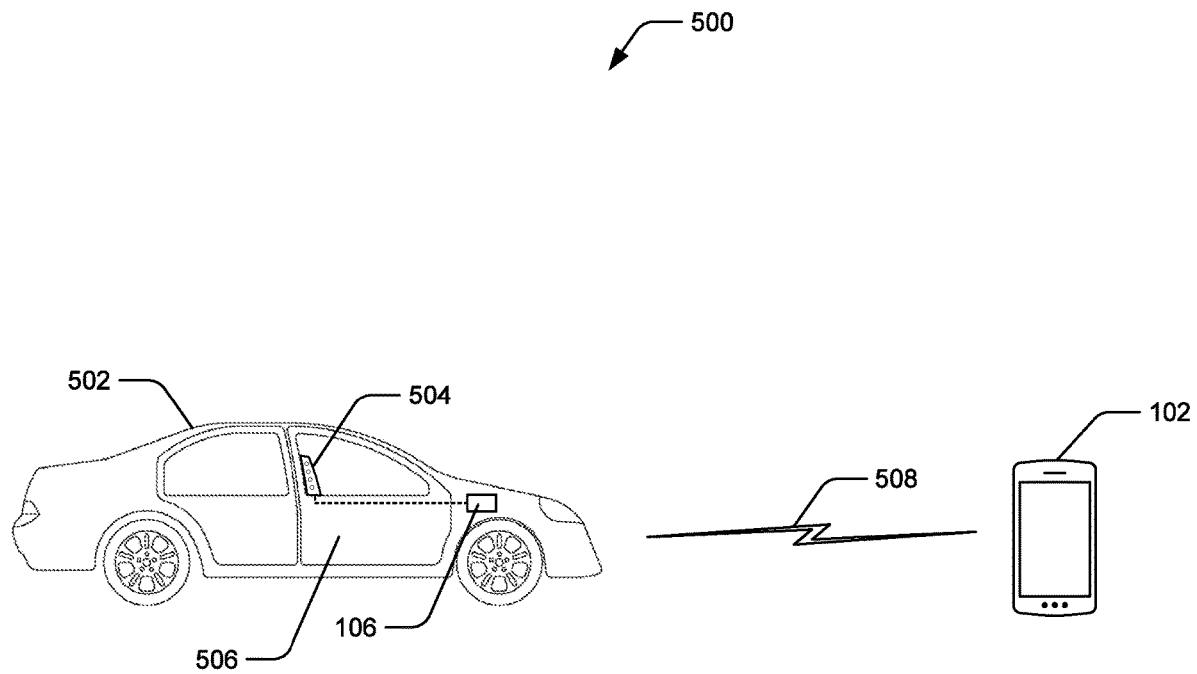
FIG. 5 illustrates an aspect of receiving an access key on a first mobile device when an authentication system is installed on a vehicle, in accordance with one aspect of the present disclosure.

FIG. 5 illustrates an example 500 of receiving the access key on the first mobile device 102 when the authentication system 106 is installed on a vehicle 502, in accordance with one example of the present disclosure. In the shown example, the authentication system 106 is a part of an electrical control unit (ECU) of the vehicle 502. In another example, the authentication system 106 may be operably connected to an in-vehicle infotainment (WI) system. The authentication system 106 further interacts with the first mobile device 102 and the second mobile device 104 to provide the access key to the first and second mobile devices 102 and 104 to perform various operations of the vehicle 502. As discussed in previous examples, the authentication system 106 has all the requisite information for authentication, such the profile of the user, including the transferable access key and the corresponding authorization information.

Further, the vehicle 502 includes a vehicle entry system 504 mounted on a vehicle door 506, for instance, on a B-pillar of the vehicle 502. The vehicle entry system 504, when operated, allows the user to gain access to the interior of the vehicle 502. Exemplary vehicle entry system 504 may include a keypad-based vehicle entry system, touchscreen-based vehicle entry system, radio-frequency identification (RFID) based vehicle entry system, near-field communication (NFC) based vehicle entry system, or the like.

In the illustrated example, the user of the first mobile device 102 obtains access to the interior of the vehicle 502 using the vehicle entry system 504. In one example, the user may enter a code to gain access to the interior of the vehicle 502. A key transfer mode is then enabled to establish a communication between the first mobile device 102 and the vehicle 502 (with ECU and/or IVI) over a short-range communication link 508, such as a Bluetooth® communication link, Wi-Fi, Ultra Wide Band (UWB) and other similar protocols to obtain the access key over the communication link 508. In order to do so, the first mobile device 102 sends a request to the ECU to establish the short-range communication session. Upon receipt of the request, the ECU may instruct the user to provide the authorization information to the ECU. In one example, the authorization information may be provided via mobile device 102, which is delivered to the ECU via the communication link 508. The ECU relays the received authorization information to the authentication system 106, which verifies the received authorization information. Specifically, the authentication system 106 matches the received authorization information with the authorization information stored (when the profile was created) in the authentication system 106. In case the received authorization information does not match with the stored authorization information, the authentication system 106 rejects the request of the first mobile device 102 for the access key. On the other hand, in case the received authorization information matches with the stored authorization information, the authentication system 106 transfers the access key to the first mobile device 102 through the short-range communication link 508. Further, upon receipt of the access key, the first mobile device 102 may establish the secure session with the ECU of vehicle 502 to perform the various operations of the vehicle 502. Additionally, the authentication system 106 may also update the profile with the information of the first mobile device 102. The information of the second mobile device 104 may or may not be retained in the profile basis input from the user.

Figure 6:
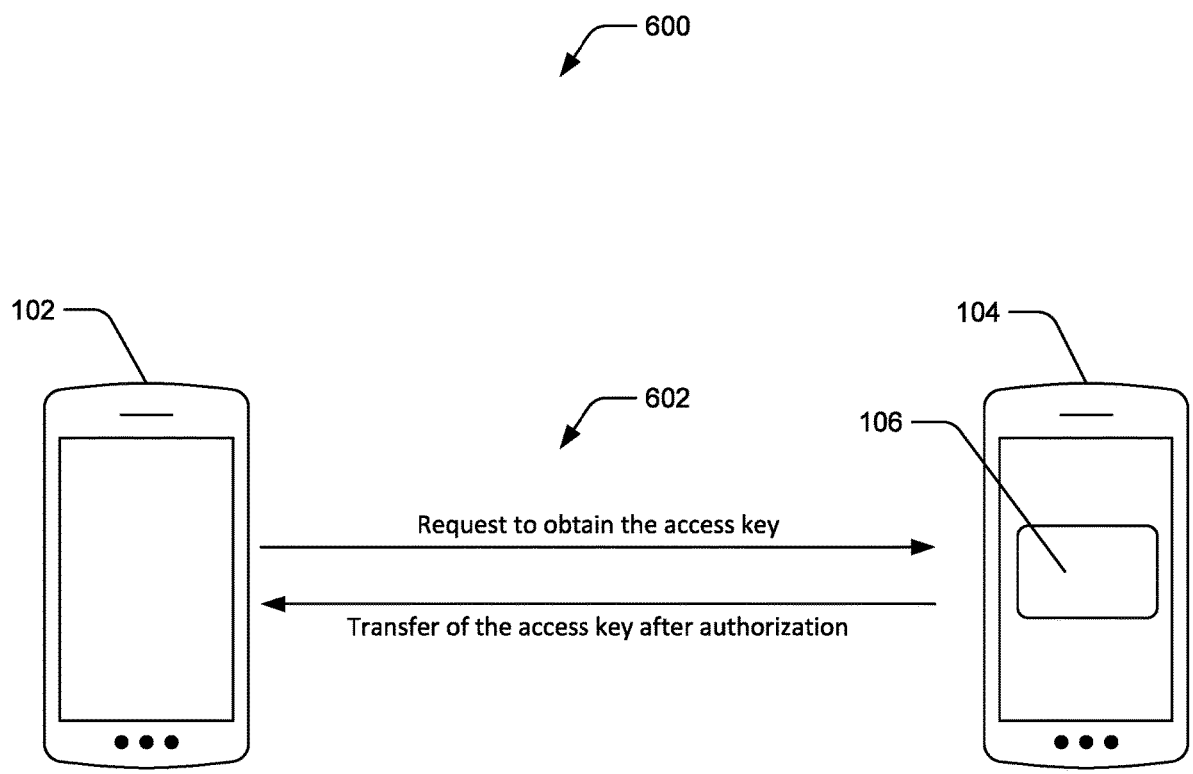
FIG. 6 illustrates an exemplary aspect of receiving the access key on the first mobile device when the authentication system is installed on the second mobile device 104, in accordance with one aspect of the present disclosure.

FIG. 6 illustrates an aspect 600 of receiving the access key on the first mobile device 102 when the authentication system 106 is installed on the second mobile device 104, in accordance with one aspect of the present disclosure. As explained in the above examples, the authentication system 106 includes the profile of the user, including the transferable access key and the authorization information. According to the present disclosure, the foregoing aspect may be employed, for example, prior to the user replacing the second mobile device 104 with the first mobile device 102.

Further, in the illustrated example, the first mobile device 102 communicates with the second mobile device 104 over a communication link 602. The communication link 602 may include any suitable wired or wireless network that can support the transfer of the access key. For instance, the communication link 602 can be a short-range communication network, such as Bluetooth®, Wi-Fi, UWB, near-field communication (NFC), or the like. It could also be a direct wired connection such as a USB-to-USB cable. Alternatively, the communication link 602 can be over a long-range communication network, such as a cellular network, a Wi-Fi network, etc. As explained in the above sections, the authentication system 106 (stored in the second mobile device 104) authenticates the first mobile device 102, upon receiving the request for the access key from the first mobile device 102. The authentication is performed using the authorization information corresponding to the profile of the user. The first mobile device 102 inputs the authorization information using the application installed thereon.

On receiving the authorization information from the first mobile device 102, the authentication system 106 operating locally on the second mobile device 104 matches the received authorization information with the authorization information stored in the authentication system 106 of the second mobile device 104 and verifies the same. In case the received authorization information does not match with the stored authorization information, the authentication system 106 rejects the request of the first mobile device 102. On the other hand, in case the received authorization information matches with the stored authorization information, the authentication system 106 of the second mobile device 104 transfers the access key to the first mobile device 102 to control the various operations of the vehicle.

It should be noted that the transfer of the access key directly from the second mobile device 104 to the first mobile device 102 does not require cloud connectivity and can be done using the applications running on the first and second mobile devices 102 and 104. Upon transferring the access key to the first mobile device 102, the application running on the second mobile device 104 automatically erases or deletes the access key from the second mobile device 104, thereby restricting the second mobile device 104 from performing any operation on the vehicle. In an alternate embodiment, the application running on the second mobile device 104 may also prompt the user to erase or delete the access key from the second mobile device 104. Further, once the first mobile device 102 obtains the access key, the first mobile device 102 can access the vehicle and control various operations in a manner explained above.

Figure 7:
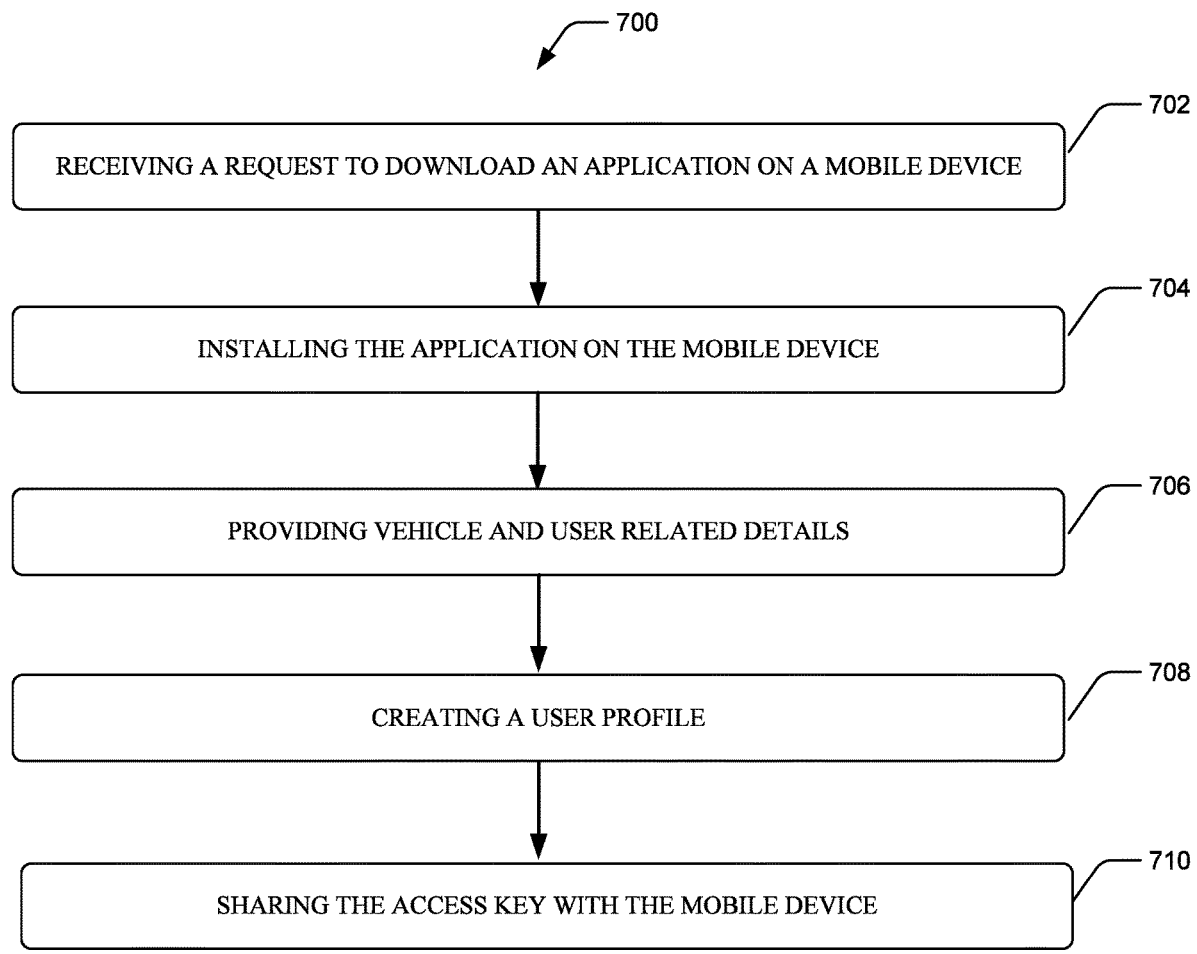
FIG. 7 illustrates a method of creating a user profile in order to obtain an access key to operate a vehicle, in accordance with the present disclosure.
Figure 8:
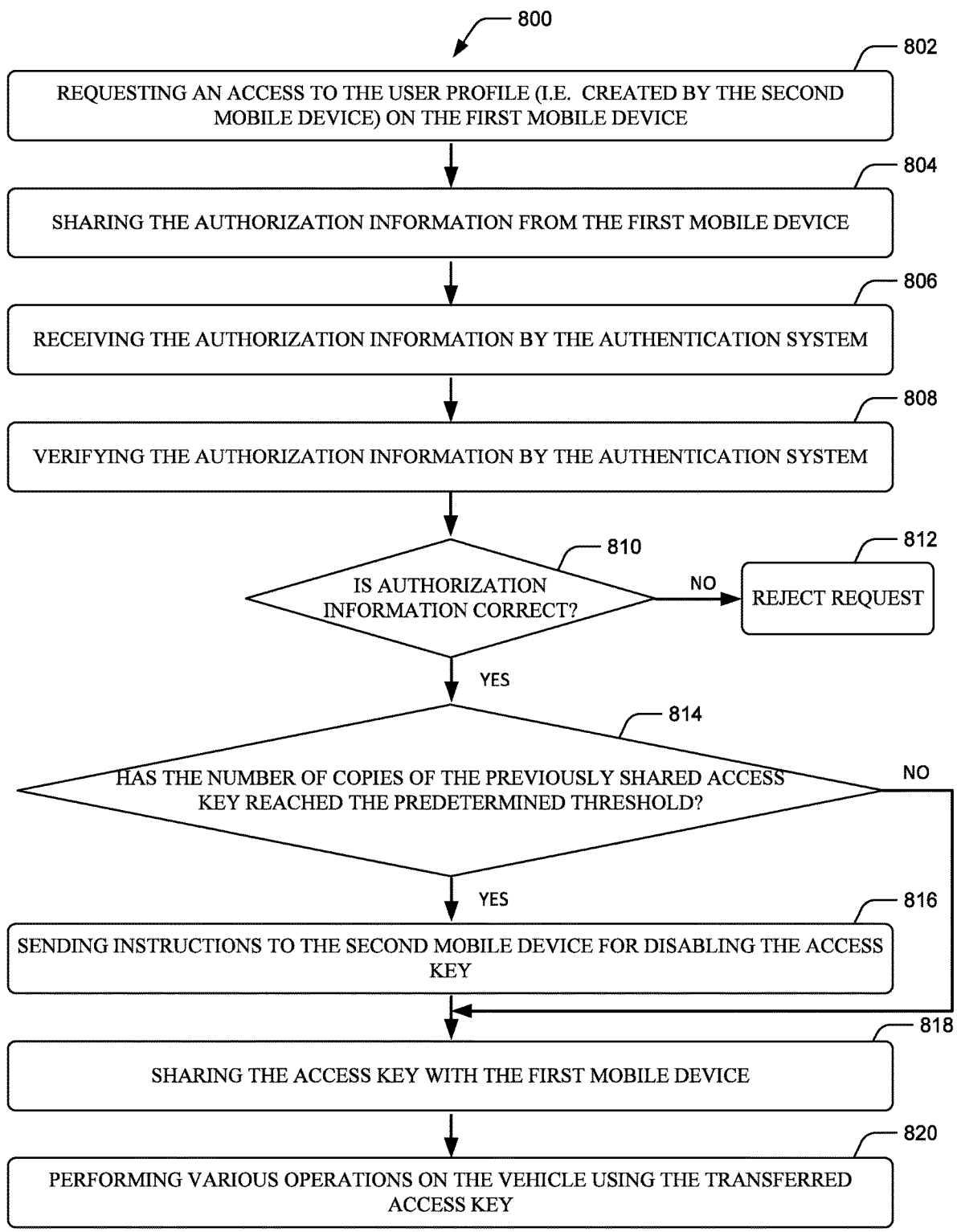
FIG. 8 illustrates a method of obtaining an access key on a mobile device when the access key is available on a different mobile device, in accordance with the present disclosure.

FIGS. 7 and 8 illustrate an overall method of the present disclosure. Specifically, FIG. 7 illustrates a method 700 of creating the profile of the user in the authentication system 106 in order to obtain the access key, in accordance with the present disclosure. FIG. 7 describes a process of profile registration and installation of access key for a vehicle of an original device (the second mobile device 104) after which such original device may become inaccessible and the access key be provided to a secondary device (the first mobile device 102). The latter process will be described with reference to FIG. 8.

The authentication system 106 can be implemented on the cloud accessible system 402, the vehicle 502 or the second mobile device 104, as explained in FIGS. 4, 5 and 6, respectively.

At step 702, a request to download the application on the second mobile device 104 is initiated. In one example, such a request may be initiated by the user at a time of purchase of the vehicle so that his/her mobile device gets registered with the authentication system 106. In an aspect, the user may operate the mobile device to send a request through a Short Messaging Service (SMS) or World Wide Web (WWW) to a server. In response to the received request, a server may send a link to download the application. In an example, the link may be sent via the SMS or an electronic mail (E-Mail) to the mobile device.

At step 704, in response to the received link, the application may be downloaded and installed on the second mobile device 104. Once installed, the application allows the second mobile device 104 to connect to the authentication system 106 over the over-the-air connection 406, the short-range communication link 508, or the communication link 602.

To create the profile, at step 706, the user provides details that are unique to the vehicle. Such details may include, but are not limited to, registration number, vehicle identification number (VIN), or the like. Once provided, the application may prompt the user to input the authorization information, such as the login credentials. In addition, the application may prompt the user to set a recovery mechanism in case the user forgets the authorization information. In one instance, the recovery mechanism can be one or more secret questions, recovery e-mail address, one-time password (OTP), a two-step authentication, or the like. In one example, the application may encrypt these user-provided details, the authorization information, and the recovery mechanism in well-known encryption technique, such as but not limited to, the public key and private key encryption. Once encrypted, the details are sent to the authentication system 106.

At step 708, based on the received details, the user profile is created on the authentication system 106. To this end, the authentication module 114 of the authentication system 106 may decrypt the encrypted details using its private key to store the profile in the repository 116 of the authentication system 106 (as shown in FIG. 2).

At step 710, the authentication module 114 of the authentication system 106 may generate the access key, used to control the various operations of the vehicle, based on the profile. Further, the authentication module 114 may encrypt the access key using a public key of the second mobile device 104. Once encrypted, the communication module 110 relays the access key to the second mobile device 104.

There may be a scenario, such as explained above, where the second mobile device 104 is not accessible by the user or the user has limited access to the second user device 104. In such a case, the user may register the first mobile device 102 with the authentication system 106 to gain access to control vehicle operations. FIG. 8 illustrates a method 800 of obtaining the access key on the first mobile device 102 that is different than the second mobile device, having the active access key, in accordance with the present disclosure. Although the method 800 is explained with respect to the mobile devices shown in FIG. 1, the method 800 can be implemented with other suitable mobile/computing devices.

At step 802, a request to access the already created user profile is placed by the first mobile device 102. The user profile is created by the second mobile device 104, as explained above with respect to FIG. 7.

At step 804, the authorization information (e.g., a password, a two-step authentication process, a code, etc.) is shared with the authentication system 106, which authenticates the first mobile device 102.

At step 806, the authentication system 106 receives the authorization information from the first mobile device 102 to get the access key in exchange.

Further, at step 808, verification of the authorization information received by the authentication system 106 is completed, as described above.

At step 810, the authentication system 106 determines if the received authorization information matches with the stored authorization information or not. In case the received authorization information does not match, the request to transfer the access key is denied at step 812 and the connection or communication is terminated.

On the other hand, in case the authorization information matches the information stored in the authentication system 106, at step 814, authentication system 106 checks the repository 116 to determine if the number of copies of the access key previously shared with the first mobile device 102 or other mobile devices has reached the predetermined maximum threshold. In case, the authentication system 106 determines that the maximum number of allowed copies of the access key is not achieved, the authentication system 106, at step 818, sends the access key to the first mobile device 102. Once the access key is received by the first mobile device 102, the first mobile device 102 can access the vehicle. In addition, the authentication system 106 adds the details of the first mobile device 102 in the list of mobile devices holding their respective access keys.

On the other hand, in case the maximum number of copies of the access key that can be activated on different mobile devices is reached, as described above, the authentication system 106, at step 816, sends an instruction to one of the mobile devices having the active access key, such as the second mobile device 104 to disable the access key. Once disabled, at step 818, the access key is activated on the first mobile device 102.

Finally, at step 820, the transferred access key enables the first mobile device 102 to perform various operations of the vehicle, such as turning on the vehicle, turning off the vehicle, parking the vehicle, adjusting cabin parameters of the vehicle, and controlling movement and speed of the vehicle.

The order in which the method is described is not intended to be construed as a limitation, and any number of the described method steps can be combined in any order to implement the method or an alternative method. Additionally, individual steps may be deleted from the method without departing from the spirit and scope of the methods, systems and devices described herein. Furthermore, the method can be implemented in any suitable hardware, software, firmware, or combination thereof.

Figure 9:
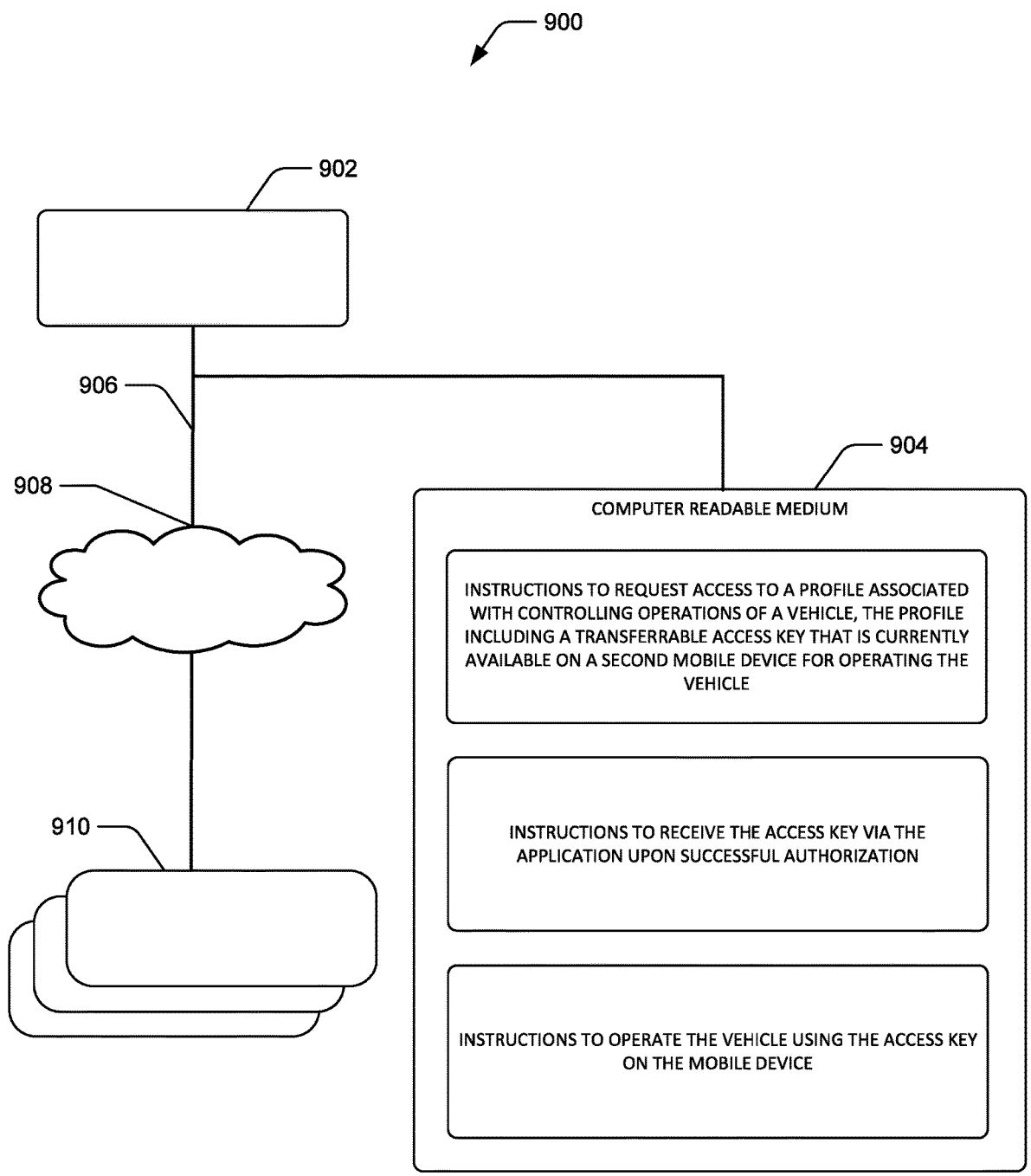
FIG. 9 illustrates an environment having a non-transitory computer-readable medium, in accordance with one aspect of the present disclosure.

FIG. 9 illustrates an environment 900 having a non-transitory computer-readable medium, in accordance with one aspect of the present disclosure. In the shown example, the environment 900 includes a mobile device 902 communicatively coupled to a non-transitory computer-readable medium 904 through a communication link 906. The mobile device 902 has one or more processing resources for fetching and executing computer-readable instructions from the non-transitory computer-readable medium 904. The mobile device 902 may also be connected to a database 910 via a network 908. It should be noted that the mobile device 902 may be the same as that of the first mobile deice 102 or the second mobile device 104 (as shown in FIG. 1)

According to an example, the non-transitory computer-readable medium 904 may be accessible by the processor 118 (as shown in FIG. 3) of the first mobile device 102 (as shown in FIG. 1). Further, the non-transitory computer-readable medium 904 may include instructions to generate the request to access the profile associated with controlling operations of the vehicle, such as the vehicle 502 (as shown in FIG. 5). As may be understood, the profile includes a transferrable access key that is currently available on the second mobile device 104 (as shown in FIG. 1) for controlling the vehicle operations. Further, the non-transitory computer-readable medium 904 may include instructions to receive the access key after the authentication system 106 (as shown in FIG. 1) successfully authenticates the first mobile device 102. Finally, the non-transitory computer-readable medium 904 may include instructions to control the various vehicle operations based on the access key.

Although the present disclosure has been described with reference to specific examples, this description is not meant to be construed in a limiting sense. Various modifications of the disclosed examples, as well as alternate examples of the present disclosure, will become apparent to persons skilled in the art upon reference to the description of the present disclosure. It is therefore contemplated that such modifications can be made without departing from the spirit or scope of the present disclosure as defined.

What is claimed is:

1. A method comprising:
receiving, from a first mobile device, a request to access a profile associated with controlling operations of a vehicle and including an access key for operating the vehicle, a copy of the access key having been previously installed on a second mobile device, and the profile being accessible via a plurality of mobile devices registered in association with the profile including the first mobile device and the second mobile device;
responsive to the request, successful authorization, and a number of copies of the access key installed on the plurality being less than a limit value, sending a copy of the access key to the first mobile device such that the first mobile device is configured to operate the vehicle using the copy of the access key on the first mobile device; and
disabling the copy of the access key installed on the second mobile device after successful activation of the copy of the access key on the first mobile device.

2. The method of claim 1, wherein operating the vehicle includes at least one of turning on the vehicle, turning off the vehicle, parking the vehicle, locking the vehicle, unlocking the vehicle, adjusting cabin parameters of the vehicle, and controlling movement and speed of the vehicle.

3. The method of claim 1, wherein the profile is stored in a cloud accessible system.

4. The method of claim 1, wherein the profile is stored on the second mobile device.

5. The method of claim 1, wherein the profile is stored on a control unit of the vehicle.

6. The method of claim 1 further comprising, responsive to the request and the number being equal to or exceeding the limit value, preventing a copy of the access key from being sent to the first mobile device.

7. The method of claim 1, wherein the limit value is greater than one.

8. A mobile device comprising:
memory having computer-readable instructions corresponding to an application for vehicle access stored therein; and
one or more processors configured to execute the computer-readable instructions to,
responsive to (i) a request to access a profile associated with controlling operations of a vehicle, the profile having an access key for operating the vehicle, a copy of the access key being currently active on the mobile device, and the profile being accessible via a plurality of mobile devices registered in association with the profile including the mobile device and a different mobile device, (ii) successful authorization, and (iii) a number of copies of the access key installed on the plurality being less than a limit value, send a copy of the access key to the different mobile device such that the different mobile device is configured to operate the vehicle using the copy of the access key on the different mobile device, and
responsive to the request and the number being equal to or exceeding the limit value, disable the copy of the access key on the mobile device.

9. The mobile device of claim 8, wherein the one or more processors are further configured to execute the computer-readable instructions to input authorization information for accessing the profile using the application for vehicle access.

10. The mobile device of claim 8, wherein operating the vehicle includes at least one of turning on the vehicle, turning off the vehicle, parking the vehicle, locking the vehicle, unlocking the vehicle, adjusting cabin parameters of the vehicle, and controlling movement and speed of the vehicle.

11. The mobile device of claim 8, wherein the one or more processors are further configured to execute the computer-readable instructions to prevent a copy of the access key from being sent to the different mobile device responsive to the request and the number being equal to or exceeding the limit value.

12. One or more non-transitory computer-readable media comprising computer-readable instructions for an application for vehicle control, which when executed by one or more processors of a vehicle, cause the one or more processors to:
responsive to (i) a request to access a profile associated with controlling operations of the vehicle, the profile including an access key that is currently available on a first mobile device for operating the vehicle, and the profile being accessible via a plurality of mobile devices registered in association with the profile including the first mobile device and a second mobile device, (ii) successful authorization, and (iii) a number of copies of the access key installed on the plurality being less than a limit value, send a copy of the access key to the second mobile device such that the second mobile device is configured to operate the vehicle using the copy of the access key on the second mobile device, and
responsive to the request and the number being equal to or exceeding the limit value, disable the copy of the access key on the first mobile device.

13. The one or more non-transitory computer-readable media of claim 12, wherein operating the vehicle includes at least one of turning on the vehicle, turning off the vehicle, parking the vehicle, locking the vehicle, unlocking the vehicle, adjusting cabin parameters of the vehicle, and controlling movement and speed of the vehicle.

14. The one or more non-transitory computer-readable media of claim 12, wherein execution of the computer-readable instructions by the one or more processors further causes the one or more processors to prevent a copy of the access key from being sent to the second mobile device responsive to the request and the number being equal to or exceeding the limit value.

\* \* \* \* \*